UNITED STATES PATENT OFFICE

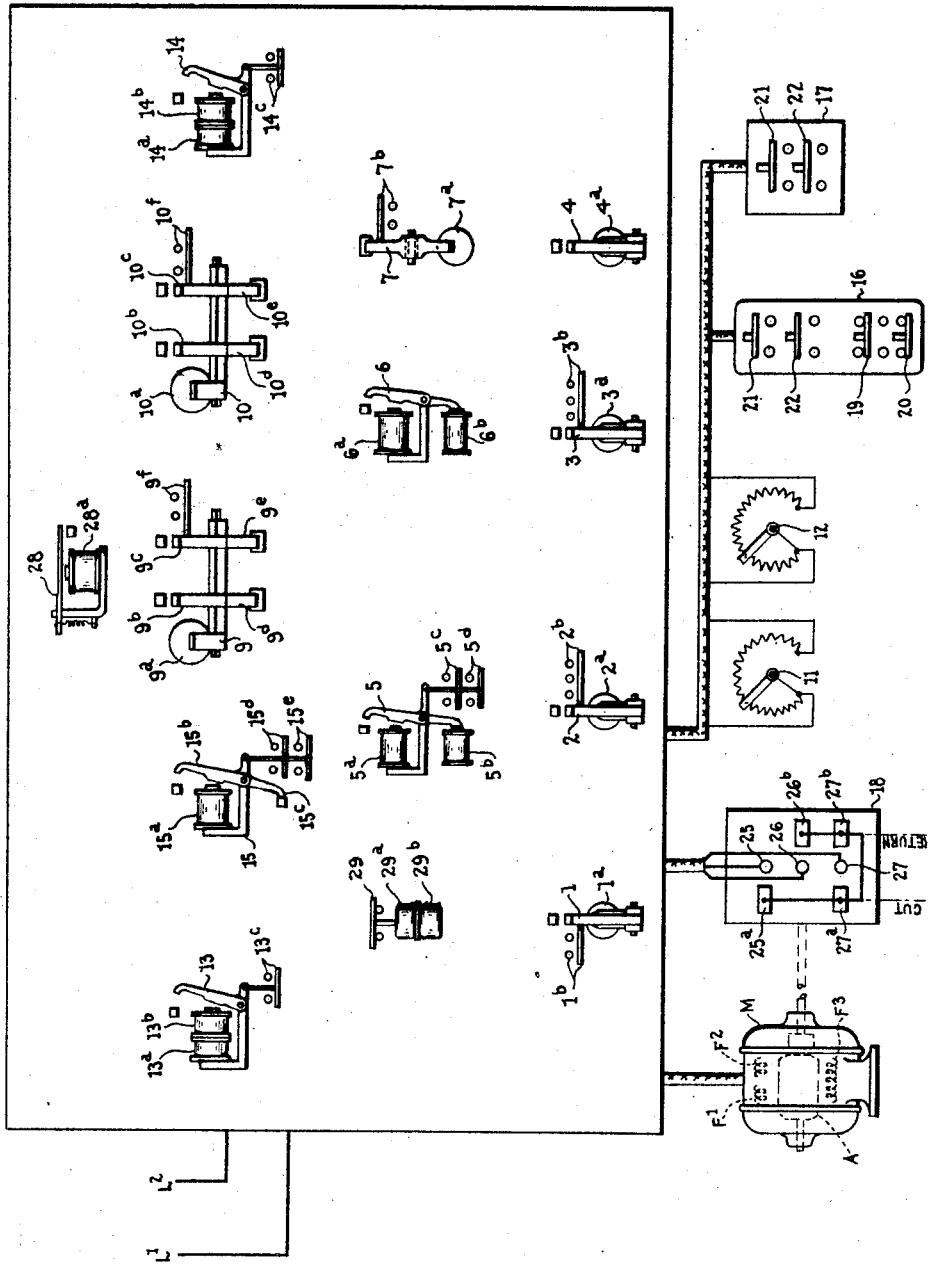

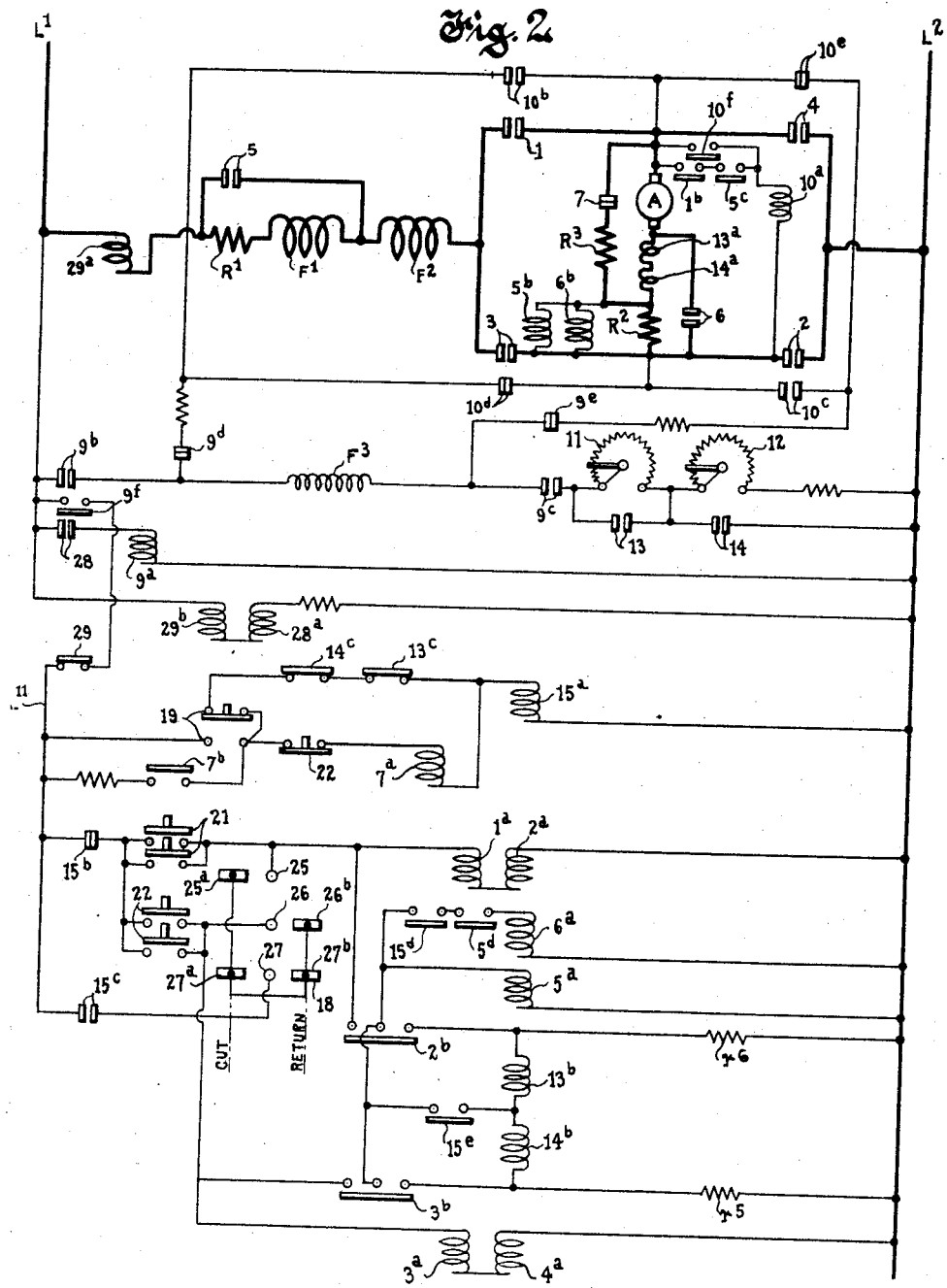

CARROLL STANSBURY, OF WAUWATOSA, AND NIELS L. MORTENSEN, OF MILWAUKEE, WISCONSIN, ASSIGNORS, BY MESNE ASSIGNMENTS, TO CUTLER-HAMMER, INC., OF MILWAUKEE, WISCONSIN, A CORPORATION OF DELAWARE

CONTROLLER FOR ELECTRIC MOTORS

Application filed December 20, 1928. Serial No. 327,347.

This invention relates to controllers for electric motors.

The invention is particularly applicable to controllers for motor driven machines such as planers, in which provision is made for effecting plugging and reversal of the driving motor upon operation thereof in opposite directions into given limits.

The invention has among its objects to provide an improved motor controller of the aforesaid character having improved means for controlling the strength of the shunt field winding of the motor during plugging operations.

Another object is to provide an improved controller of the aforesaid character in which provision is made for stopping the motor by dynamic braking under abnormal conditions in the supply circuit, or upon failure of the reversing switches to effect plugging of the motor within a given interval in the cutting and return limits of the planer.

Another object is to provide a controller of the aforesaid character having improved means for insuring excitation of the shunt field winding of the motor in the proper direction for dynamic braking under no voltage conditions.

Another object is to provide a controller of the aforesaid character having improved means for affecting inching operations of the motor in opposite directions at a reduced speed.

Various other objects and advantages of the invention will hereinafter appear.

The accompanying drawings illustrate an embodiment of the invention which will now be described, it being understood that the embodiment illustrated is susceptible of modification without departing from the spirit and scope of the appended claims.

In the drawings—

Figure 1 illustrates the elements of the controller embodying the invention, and Fig. 2 is an across-the-line diagram illustrating the circuit connections for the controller shown in Fig. 1.

Referring to Fig. 1, the same illustrates a driving motor M for operating a reciprocating machine tool such as a planer. Said motor is provided with an armature A, series field windings $F^1$ and $F^2$ and a shunt field winding $F^3$.

The control means for the armature circuit of motor M includes two sets of electroresponsive direction switches 1—2 and 3—4, electroresponsive accelerating switches 5 and 6, and an electroresponsive dynamic braking switch 7. Switches 1—2 and 3—4 serve to selectively establish reverse power connections for the motor armature and it is assumed that the former set of switches provides for operation of the motor in its cutting direction, while the latter set provides for operation thereof in its return direction. Each of the accelerating switches 5 and 6 is provided with an operating winding $a$ and a lockout winding $b$, and as shown in Fig. 2 the former switch is responsive to shunt the series field winding $F^1$ and also a step of accelerating resistance $R^1$ while the latter is responsive to shunt a step of accelerating resistance $R^2$. The dynamic braking switch 7 is normally closed, and as shown in Fig. 2 the same provides for connection of a dynamic braking resistance $R^3$ across the terminals of the motor armature.

The control means for the shunt field winding $F^3$ of the motor includes electroresponsive switches 9 and 10, adjustable speed regulating rheostats 11 and 12, and electroresponsive switches 13 and 14. Each of the switches 9 and 10 is provided with two sets of normally open contacts $b$ and $c$, and two sets of normally closed contacts $d$ and $e$. The contacts $b$ and $c$ of switch 9 provide for connection of the shunt field winding $F^3$ of the motor across the supply circuit in series with rheostats 11 and 12, while the contacts $c$ and $d$ thereof function to connect said field winding across the motor armature through the medium of switch 10 for dynamic braking under no-voltage conditions. Switch 10 provides for connection of the shunt field winding across the motor armature in the proper relation for dynamic braking. Switches 13 and 14 are each provided with a series operating winding $a$ and a shunt holding winding $b$, and as hereinafter set forth the same are associated with the rheostats 11 and 12 to exclude said rheostats from the shunt field circuit of the motor during starting and to thereafter provide for speed regulation of the motor in its cutting direction by rheostat 11 and in its return direction by rheostat 12.

The control means for the two sets of direction switches 1—2 and 3—4 includes an electroresponsive relay 15, pendant switch push button stations 16 and 17, and a master switch 18. Relay 15 is provided with normally open contacts $b$ and normally closed contacts $c$, and as hereinafter set forth the energizing circuit thereof is controlled through the medium of a normally open start push button 19, and a normally closed stop push button 20 associated with station 16. Relay 15 in its normal position establishes connections whereby the direction switches 1—2 and 3—4 can be selectively controlled by push buttons 21 and 22 associated with each of the stations 16 and 17 to effect inching operation of the motor in either direction. Relay 15 in responding provides for automatic control of the direction switches 1—2 and 3—4 by the master switch 18. Master switch 18 is provided with stationary contacts 25—26 and 27 and two sets of electrically connected movable contacts $25^a$—$27^a$ and $26^b$—$27^b$. The master switch 18 is operatively connected to the platen of the planer, and the arrangement is such that contacts $25^a$ and $27^a$ engage their cooperating stationary contacts upon movement of the platen of the planer into its cutting limit, while contacts $26^b$ and $27^b$ engage contacts 26 and 27 upon movement of the platen into its return limit.

The controller also includes a normally open no voltage relay 28 and a normally closed overload relay 29, the later having an operating winding $a$ and a holding winding $b$. Relay 28 controls the aforementioned switch 9, and as hereinafter set forth said switch in responding establishes a feed for certain of the aforementioned relays and switches through the medium of the overload relay 29. Also as shown in Fig. 1 certain of the aforementioned switches and relays are provided with auxiliary contacts the purpose of which will be hereinafter more fully described in connection with the operation of the controller.

The operation of the aforedescribed controller will now be more fully described in connection with Fig. 2. The operating winding $28^a$ of voltage relay 28 and the shunt holding winding $29^b$ of overload relay 29 are permanently connected in series across the supply circuit indicated by line $L^1$—$L^2$. Relay 28 is thus normally energized and connects the operating winding $9^a$ of switch 9 across the supply circuit $L^1$—$L^2$. The contacts $9^b$ and $9^c$ of switch 9 connect the shunt field winding $F^3$ of the motor across the supply circuit $L^1$—$L^2$ in series with the rheostats 11 and 12, while the auxiliary contacts $9^f$ of said switch establish a circuit from line $L^1$ to a feed line $L^{11}$ through the medium of overload relay 29.

Depression of the start push button 19 connects the operating winding $7^a$ of the dynamic braking switch 7 and the operating winding $15^a$ of relay 15 across lines $L^1$—$L^2$ through the medium of the stop push button 20. Assuming that the master switch 18 is in its cutting position, response of relay 15 establishes a circuit from line $L^{11}$ through the contacts $15^c$ of said relay through contacts 27, $27^a$, $25^a$ and 25 of master switch 18 and through the operating windings $1^a$ and $2^a$ of direction switches 1—2 to line $L^2$. Direction switches 1—2 in closing establish a circuit from line $L^1$ through the series operating winding $29^a$ of the overload relay 29 through resistance $R^1$ and series fields $F^1$ and $F^2$ through direction switch 1 to and through the motor armature A through the series operating coils $13^a$ and $14^a$ of switches 13 and 14 and resistance $R^2$, and thence through the direction switch 2 to line $L^2$. Energization of the series operating coils $13^a$ and $14^a$ of switches 13 and 14 effects closure of said relays to exclude the rheostats 11 and 12 from the shunt field circuit of the motor and the motor thus starts with its shunt field winding fully excited. Push button 19 can then be released, and upon release thereof relay 15 and the dynamic brake switch 7 are maintained energized through the medium of the auxiliary contacts $7^b$ of said latter switch and the stop push button 20.

Immediately upon closure of the direction switches 1—2 the shunt operating coil $5^a$ of accelerating switch 5 is connected in parallel with the operating windings of said direction switches by closure of the auxiliary contacts $2^b$ of direction switch 2. However, accelerating switch 5 does not respond immediately due to the restraining action of its lockout winding $5^b$ which is connected in shunt with resistance $R^2$. When the current in the motor circuit drops to a given value the operating winding $5^a$ overcomes the restraining action of the lockout winding $5^b$ and accelerating switch 5 then closes to exclude resistance $R^1$ and the field $F^1$ from the armature circuit of the motor. Immediately upon closure of accelerating switch 5 the operating winding $6^a$ of accelerating switch 6 is connected in parallel with the operating windings of the direction switches 1—2 through the medium of the auxiliary contacts $2^b$ of the latter direction switch, auxiliary contacts $15^d$ of relay 15 and the auxiliary contacts $5^b$ of accelerating switch 5. Response of accelerating switch 6 is delayed due to the action of its lockout winding $6^b$ which is connected across resistance $R^2$.

However, when the current in the motor circuit drops to a given value accelerating switch 6 responds to exclude resistance $R^2$ and the operating coils $13^a$ and $14^a$ of switches 13 and 14 from the armature circuit of the motor. Switch 13 then returns to normal position to include the rheostat 11 in the shunt field circuit of the motor since the holding winding $13^b$ thereof is short-circuited by contacts $2^b$ of direction switch 2 and $15^c$ of relay 15. However, switch 14 is maintained in closed position to exclude rheostat 12 from the field circuit of the motor since the holding winding $14^b$ thereof is energized by a circuit extending from line $L^{11}$ through the contacts $15^c$ of relay 15 through contacts 27, $27^a$, $25^a$ and 25 of the master switch through the auxiliary contacts $2^b$ of direction switch 2, auxiliary contacts $15^e$ of switch 15 and thence through the holding winding $14^b$ and a resistance $r^5$ to line $L^2$. The shunt field circuit is thus weakened by inclusion of the cutting rheostat 11 and the speed of the motor is determined by the setting of said rheostat.

When the motor operates into its cutting limit the master switch 18 is thrown into its return position and the direction switches 1—2, accelerating switches 5 and 6 and switch 13 are deenergized. At this time the dynamic braking switch 7 and relay 15 are adapted to remain in closed position for a temporary period, as hereinafter set forth, and the direction switches 3—4 are thus energized by a circuit extending from line $L^{11}$ through contacts $15^c$ of switch 15 through contacts 27, $27^b$, $26^b$ and 26 of the master switch and thence through the operating windings of said direction switches to line $L^2$. Upon closure of direction switches 3 and 4 the motor armature and the operating windings $13^a$ and $14^a$ of switches 13 and 14 are connected across lines $L^{11}$—$L^2$ in the same manner as upon closure of switches 1 and 2, except that the connections for the motor armature are reversed. The motor is thus plugged and switches 13 and 14 are energized to shunt the rheostats 11 and 12 after establishment of the plugging connections. Upon closure of direction switch 3 the auxiliary contacts $3^b$ thereof connect the operating winding $5^a$ of accelerating switch 5 in parallel with the operating windings of direction switches 3 and 4 but closure of said accelerating switch is delayed by its lockout winding $5^b$. Lockout winding $5^b$ is designed to permit closure of accelerating switch 5 by its operating winding $5^a$ as soon as the motor is brought to rest, and as hereinbefore set forth closure of said accelerating switch effects exclusion of resistance $R^1$ and the series field winding $F^1$ from the motor circuit. Upon closure of accelerating switch 5 the contacts $5^d$ thereof connect the operating winding $6^a$ of accelerating switch 6 in parallel with the operating windings $3^a$ and $4^a$ of the return direction switches through the medium of contacts $3^b$ of direction switch 3 and the auxiliary contacts $15^d$ of relay 15. When the current in the motor circuit drops to a given value after reversal of the motor operating winding $6^a$ of accelerating switch 6 overcomes the restraining action of the lockout winding $6^d$ to effect closure of said accelerating switch. Closure of accelerating switch 6, as hereinbefore set forth, excludes resistance $R^2$ and the series operating windings $13^a$ and $14^a$ of switches 13 and 14 from the motor circuit. Switch 14 then drops out to include rheostat 12 in the shunt field circuit of the motor since the holding winding $14^b$ of said switch is shunted through auxiliary contacts $3^b$ of direction switch 3 and $15^c$ of relay 15. However, switch 13 remains in closed position to exclude rheostat 11 from the shunt field circuit, the holding winding $13^b$ of said switch being energized by a circuit extending from line $L^{11}$ through the contacts $15^c$ of relay 15 through contacts 27, $27^b$, $26^b$ and 26 of the master switch, through auxiliary contacts $3^b$ of direction switch 3 and auxiliary contacts $15^e$ of relay 15 and thence through the holding winding $13^b$ and a resistance $r^6$ to line $L^2$. Upon operation of the motor into its return limit the master switch 18 is returned to its cutting position and the controller again operates in a manner similar to that hereinbefore described to plug the motor and then reverse the same.

In connection with the foregoing it should be noted that each time the master switch 18 is operated to reverse the motor both of the switches 13 and 14 are deenergized for inclusion of both of the rheostats 11 and 12 in the shunt field circuit of the motor. Upon deenergization of both of the switches 13 and 14 the auxiliary contacts $13^c$ and $14^c$ thereof short-circuit the operating winding $7^a$ of the dynamic braking switch 7 through the medium of the normally closed contacts of the start push button 19 and the stop push button 20. When the operating winding $7^a$ is short-circuited the same acts by self-induction to delay return of the dynamic braking switch 7 to closed position. Under normal conditions short-circuiting of the operating winding $7^a$ is only momentary and the dynamic braking switch 7 remains in open position. However, if either set of direction switches fails for any reason to establish reverse power connections for the motor the switches 13 and 14 remain in normal position and the dynamic braking switch 7 thus returns to closed position after a predetermined interval to connect resistance $R^3$ across the armature A for stopping of the motor by dynamic braking. Upon return of switch 7 to closed position the contacts $7^b$ thereof deenergize relay 15 and said relay in opening interrupts the feed circuit extending through its contacts 15ᶜ for direction switches 1—2 and 3—4, accelerating switches 5 and 6 and the switches 13 and 14. However, during dynamic braking switches 13 and 14 are maintained in closed position by their operating windings 13ᵃ and 14ᵃ to thereby exclude rheostats 11 and 12 from the shunt field circuit of the motor. Dynamic braking switch 7 and relay 15 can be deenergized at any time to stop the motor by depression of the stop push button 20 or by response of the overload relay 29.

The push buttons 21 and 22 of stations 16 and 17 provide for control of the direction switches to effect inching operations of the motor. When the motor is stopped relay 15 is in normal position and the contacts 15ᵇ thereof establish a feed from line $L^{11}$ to the push buttons 21 and 22. Each of the push buttons 21 is then adapted to complete the energizing circuit for the operating windings 1ᵃ and 2ᵃ of the cut direction switches while each of the push buttons 22 is then adapted to complete the energizing circuit for the operating windings 3ᵃ and 4ᵃ of the return direction switches. Upon closure of either set of direction switches 1—2 or 3—4 accelerating switch 5 is controlled as hereinbefore set forth to exclude resistance $R^1$ and field $F^1$ from the armature circuit. However, accelerating switch 6 cannot respond during inching operations since the energizing circuit thereof is interrupted by the auxiliary contacts 15ᵈ of relay 15. Also it should be noted that during inching operations the holding windings $b$ of each of the switches 13 and 14 act cumulatively with the operating windings $a$ of said switches to insure closure thereof to thereby insure exclusion of rheostats 11 and 12 from the shunt field circuit of the motor.

Under no voltage conditions switch 9 acts through the medium of switch 10 to establish connections which provide for energization of the shunt field $F^3$ for dynamic braking of the motor. Relay 28 opens under no voltage conditions and interrupts the energizing circuit of switch 9. Upon return of switch 9 to normal position the contacts 9ᵈ and 9ᵉ thereof connect the field winding $F^3$ in shunt with armature A, operating windings 13ᵃ and 14ᵃ of switches 13 and 14 and resistance $R^2$ through the medium of the switch 10. When switch 10 is deenergized the contacts 10ᵈ and 10ᵉ thereof establish connections which provide for excitation of the field winding $F^3$ in the proper direction for dynamic braking during operation of the motor in its return direction. However, when switch 10 is energized the contacts 10ᵇ and 10ᶜ thereof establish connections for excitation of the field $F^3$ in the proper direction for dynamic braking during operation of the motor in its cutting direction.

Switch 10 is energized as long as the motor is operating in its cutting direction by means which will now be described. As hereinbefore set forth, when the motor is operating in its return direction and reaches its return limit the direction switches 1—2 are closed to plug the motor, and when the motor is brought to rest accelerating switch 5 is closed. It is apparent from Fig. 2 that upon closure of the direction switches 1—2 and accelerating switch 5 the auxiliary contacts 1ᵇ associated with the former direction switch and the auxiliary contacts 5ᶜ associated with said accelerating switch 5 connect the operating winding 10ᵃ in shunt with armature A, windings 13ᵃ and 14ᵃ and resistance $R^2$ and switch 10 therefor responds as soon as the motor begins to operate in its cutting direction. Upon response of switch 10 the auxiliary contacts 10ᶠ thereof shunt the contacts 1ᵇ and 5ᶜ and as is apparent if no voltage conditions occur while the motor is operating in its cutting direction the auxiliary contacts 10ᶠ maintain switch 10 energized to provide the required braking connections for the field $F^3$ until the motor is brought to rest.

In connection with the foregoing it should be noted that the required control effects are obtained by a relatively small number of control switches, and it should also be noted that automatic operation of the motor, inching operations and the transfer from automatic to inching operation is effected through the medium of the pendant switch provided with only four push buttons.

What we claim as new and desire to secure by Letters Patent is:

1. The combination with a reversible driving motor, of means for selectively controlling reverse power connections for said motor for operation thereof in opposite directions between given limits and for plugging thereof at said limits, and means for establishing a dynamic braking circuit for said motor upon failure of said former means to establish plugging connections for said motor within a given interval at said limits.

2. The combination with a reversible driving motor, of means for selectively controlling reverse power connections for said motor to effect operation thereof in opposite directions between given limits and to effect plugging thereof at such limits, means for strengthening the field of said motor after establishment of plugging connections by said former means, and means under the control of said last mentioned means for establishing dynamic braking connections for said motor upon failure of said first mentioned means to establish plugging connections within a predetermined interval at either of said limits.

3. The combination with a reversible driving motor, of means for selectively controlling reverse power connections for said motor for operation thereof in opposite directions between given limits and for plugging thereof at said limits, means for establishing dynamic braking connections for said motor upon failure of said former means to establish plugging connections within a given interval at said limits, and means associated with said latter means for rendering said former means ineffective to restart said motor after establishment of braking connections.

4. The combination with a reversible driving motor, of means for selectively controlling reverse power connections for said motor to effect operation thereof in opposite directions between given limits and to effect plugging thereof at said limits, an electromagnetic switch for controlling a dynamic braking circuit for said motor, said switch beng responsive upon establishment of power connections by said means, and means for deenergizing said switch upon failure of said first mentioned means to plug said motor within a predetermined interval at said limits.

5. The combination with a reversible driving motor, of means for selectively establishing reverse power connections for said motor, separate resistance devices each for determining the speed of said motor during operation thereof in one direction, a switch associated with each of said devices for shunting the same, each of said switches having an operating winding and a holding winding, the former winding being connected in a series in the armature circuit of said motor to effect response of said switches upon establishment of power connections for said motor, means for rendering both of said operating windings ineffective under given current conditions in the motor circuit and means for controlling the holding windings of said switches to energize the same alternately upon operation of said motor in opposite directions.

6. The combination with a reversible driving motor having a shunt field winding, of means for selectively establishing reverse power connections for said motor to effect operation thereof in opposite directions between given limits and plugging thereof at said limits, separate resistance devices in the shunt field circuit of said motor each for determining the speed of said motor in one direction, and means for rendering both of said devices ineffective during starting of said motor in either direction and for thereafter rendering said devices effective in accordance with the direction of operation of said motor, said last mentioned means being also adapted to render both of said devices ineffective following establishment of plugging connections for said motor.

7. The combination with a reversible driving motor, of means for selectively establishing reverse power connections for said motor for operation thereof in opposite directions between given limits and for plugging thereof at such limits, an electromagnetic switch for controlling a dynamic braking circuit for said motor, said switch being responsive to interrupt said circuit upon establishment of power connections for said motor, means for weakening the field of said motor upon establishment of power connections for said motor and for strengthening said field under given current conditions in the motor circuit, and means associated with said field control means for deenergizing said braking switch upon failure of said first mentioned means to effect plugging of said motor within a predetermined interval at said limits.

8. The combination with a reversible driving motor having a shunt field winding, of means for establishing dynamic braking connections for said motor under no voltage conditions in the motor circuit, said means including a pair of control switches, one of which is adapted under no voltage conditions to connect said shunt field winding in shunt with the armature of said motor through the medium of the other of said switches, and the other of said switches being normally adapted to connect said shunt field winding in a given relation with respect to the armature of said motor upon operation of said motor in one direction and in a reversed relation with respect thereto upon operation of said motor in an opposite direction.

9. The combination with a reversible driving motor having a shunt field winding, of means for establishing dynamic braking connections for said motor under no voltage conditions in the motor circuit, said means including a pair of electroresponsive control switches, one of said switches being adapted under no voltage conditions to connect said shunt field winding across the motor armature through the medium of the other of said switches, and said latter switch being normally adapted to connect said shunt field winding in a given relation with respect to the motor armature upon operation of said motor in one direction and means responsive upon operation of said motor in a reverse direction to effect response of said latter switch for connection of said shunt field winding across the motor armature in a reversed relation with respect thereto.

In witness whereof, we have hereunto subscribed our names.

NIELS L. MORTENSEN.
CARROLL STANSBURY.